Oct. 25, 1938.  N. TRBOJEVICH  2,134,062

GAUGE

Filed Dec. 30, 1935

INVENTOR
NIKOLA TRBOJEVICH
BY Whittemore Hulbert Whittemore
   Belknap  ATTORNEYS Patented Oct. 25, 1938

2,134,062

UNITED STATES PATENT OFFICE 2,134,062

GAUGE

Nikola Trbojevich, Detroit, Mich.

Application December 30, 1935, Serial No. 56,818

5 Claims. (Cl. 33—174)

This invention relates to gauges of the solid block or wedge type for the purpose of accurately measuring or reproducing angles in toolrooms, laboratories, etc.

The invention resides in the formation and selection of blocks to form a set and also in the method of stacking up the blocks to obtain any desired angle simply, directly and precisely. My method is extraordinarily rich in combinations in that it is possible to reproduce any angle whatever from zero to ninety degrees in degrees, minutes and seconds from a set comprising only fifteen pieces for a total of 324,000 distinct combinations representing each and every second in the above mentioned range.

My system is to a degree analogous to the well known block system of Johansson gauges which latter, however, can only be used for measuring distances (lengths). In the Johansson system 81 blocks are employed and by means of combinations any distance up to 10 inches can be built up from the said blocks in steps of .0001", a total of 100,000 combinations. The blocks are manufactured with such a wonderful precision that even the cumulative error can never exceed .00004 inch.

Figure 1:
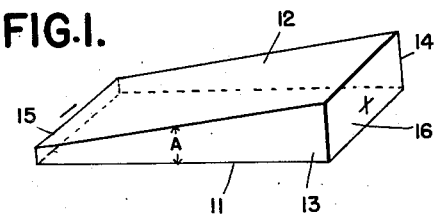
Fig. 1 shows a wedge shaped gauge block in perspective.

In my system I employ blocks of a prismatic or wedge shape, Fig. 1, to measure the angles. The sides 11 and 12 are two extremely accurately ground and lapped planes exactly including a predetermined angle A. The side planes 13 and 14 are parallel to each other and perpendicular to both planes 11 and 12. The object of the planes 13 and 14 is to serve as reference surfaces when the blocks are stacked up, i. e., they are lined up against a straight edge or surface plate in order that angles represented by the individual blocks may be correctly added and subtracted.

The gauge is further bounded by the surface 15 at its small end, i. e., nearest to the apex of the angle A, and the opposite surface 16 forming the large end of the wedge. The surfaces 15 and 16 do not have to be finished at all and are conveniently used for stamping the blocks. I stamp the degrees, minutes and seconds with the letters D, M and S respectively, the small end 15 with a minus (—) sign and the large end 16 with a plus (+) sign. Thus, +8M means the large end of the 8 minute block. A convenient size for these blocks would be about 2¼" long, 1" wide and ⅛" thick at the small end.

It is of great interest now to note (in fact, that is the basis of my invention) that when two blocks are assembled or stacked up with their plus (+) sides adjacent they represent the sum of the two angles and when they are stacked up with their plus and minus ends adjacent they represent the difference of the said angles. The truth of this simple Euclidean fact is too obvious to require a formal proof. It is also obvious that the order in which the blocks are stacked up is immaterial, and that any one block may be turned upside down along its longitudinal axis without affecting the final result.

Figure 3:
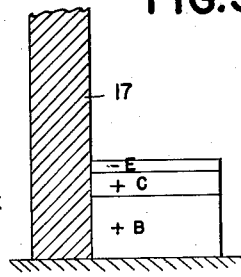
Fig. 3 is a side view of Fig. 2 and shows the method of aligning the blocks.
Figure 2:
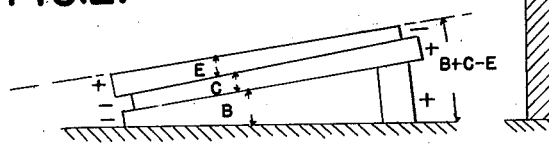
Fig. 2 shows three blocks assembled explanatory of the differential principle which I employ.

In Figs. 2 and 3, it is shown how the blocks representing the angles B, C and E are stacked to produce the resulting angle B+C—E, i. e., with their plus, plus and minus respective ends adjacent. In Fig. 3 the rectangular bar 17 is used to align the side planes of the gauges.

Figure 4:
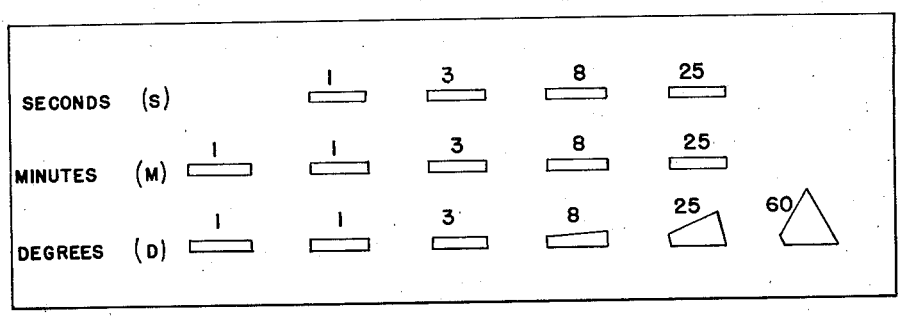
Fig. 4 shows in a diagram form, the members of unit angles in a fifteen piece set.

In Fig. 4 a complete set of gauges comprising 15 blocks is diagrammatically shown from which any degree, minute and second and all three of them simultaneously may be built up. The process will be readily understood from the following table giving the needed combinations for all numbers from 1 to 60 inclusive. The set is made up in three groups of five numbers each, i. e., the numbers 1, 3, 8, 25 and 60. Thus only one chart is required for either degrees, minutes or seconds.

Table of combinations

| D., M. or S. | Combination |
|---|---|
| 1 | 1 |
| 2 | 3—1 |
| 3 | 3 |
| 4 | 3+1 |
| 5 | 8—3 |
| 6 | 8—3+1 |
| 7 | 8—1 |
| 8 | 8 |

*Table of combinations*—Continued

| D., M. or S. | Combination |
|---|---|
| 9 | 8+1 |
| 10 | 8+3−1 |
| 11 | 8+3 |
| 12 | 8+3+1 |
| 13 | 25−8−3−1 |
| 14 | 25−8−3 |
| 15 | 25−8−3+1 |
| 16 | 25−8−1 |
| 17 | 25−8 |
| 18 | 25−8+1 |
| 19 | 25−8+3−1 |
| 20 | 25−8+3 |
| 21 | 25−3−1 |
| 22 | 25−3 |
| 23 | 25−3+1 |
| 24 | 25−1 |
| 25 | 25 |
| 26 | 25+1 |
| 27 | 25+3−1 |
| 28 | 25+3 |
| 29 | 25+3+1 |
| 30 | 25+8−3 |
| 31 | 25+8−3+1 |
| 32 | 60−25−3 |
| 33 | 60−25−3+1 |
| 34 | 60−25−1 |
| 35 | 60−25 |
| 36 | 60−25+1 |
| 37 | 60−25+3−1 |
| 38 | 60−25+3 |
| 39 | 60−25+3+1 |
| 40 | 60−25+8−3 |
| 41 | 60−25+8−3+1 |
| 42 | 60−25+8−1 |
| 43 | 60−25+8 |
| 44 | 60−25+8+1 |
| 45 | 60−25+8+3−1 |
| 46 | 60−25+8+3 |
| 47 | 60−25+8+3+1 |
| 48 | 60−8−3−1 |
| 49 | 60−8−3 |
| 50 | 60−8−3+1 |
| 51 | 60−8−1 |
| 52 | 60−8 |
| 53 | 60−8+1 |
| 54 | 60−8+3−1 |
| 55 | 60−8+3 |
| 56 | 60−3−1 |
| 57 | 60−3 |
| 58 | 60−3+1 |
| 59 | 60−1 |
| 60 | 60 |

Note that in Fig. 4 the duplicate 1M and 1D blocks are the same as the 60 minutes or seconds numbers respectively found in the above table.

Figure 5:
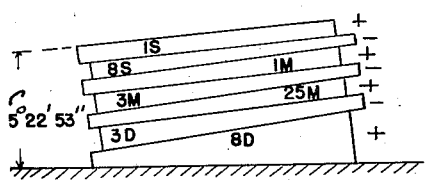
Fig. 5 shows the method of building up any desired angle by using only the pieces from the set shown in Fig. 4.

In Fig. 5 (as an example), the angle 5°22'53" is shown as built up from the pieces in the set Fig. 4 and with the aid of the above table. Thus,

5D=8D−3D
22M=25M−3M
53S=1M−8S+1S

In the example I am using altogether 2+2+3=7 pieces. The average number from 3 minimum to 15 maximum, is about 9 pieces. Thus, I make each block at least ten times as accurate as the user's accuracy requirement in order to provide against the possible cumulative error.

Figure 6:
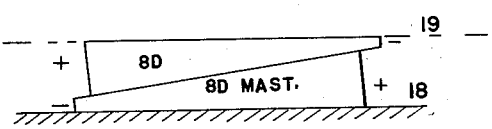
Fig. 6 shows the method of checking a commercial gauge from a master gauge during manufacture.

In manufacturing these gauges I first make a set of master blocks, e. g., the one marked 8D Mast. in Fig. 6 from which the commercial block marked 8D may be conveniently checked by measuring the planes 18 and 19 for parallelism. The set shown in Fig. 4 is somewhat too elaborate for most uses. In a shop or laboratory about 10 seconds is the practical limit to which one can or wishes to work. In such a case I omit from Fig. 4 the blocks denoting 1, 3, 8 and 25 seconds respectively and replace them with only two blocks, 10 and 30 seconds respectively, thus reducing the set to only 13 pieces. The 10 second spacings are built up as follows:

10=10
20=30−10
30=30
40=30+10
50=60−10
60=60

What I claim as my invention is:

1. An angle constructing set of gauges comprising a plurality of wedge shaped prismatic blocks arranged substantially on the basis of a geometric series in which each block has two measuring plane sides forming a predetermined acute angle with each other and two reference plane sides parallel to each other and perpendicular to the two first mentioned planes, the arrangement being such that any selection of blocks taken from the set may be stacked up upon their measuring sides either convergently or divergently and in any desired order and the reference planes aligned to correctly obtain a predetermined compound angle.

2. An angle constructing set of gauges comprising a plurality of wedge shaped blocks capable of being stacked up with their tapering sides touching and aligned either convergently or divergently, in which the wedge angles of the individual blocks are arranged in a series in which the numbers and their differences are progressively increasing so that numerous combinations may be formed from their respective sums and differences to cover all integers of angular scale measurements.

3. An angle constructing set of gauges comprising three series of wedge shaped blocks for measuring degrees, minutes and seconds respectively by stacking up blocks with their tapering sides touching convergently or divergently, in which the included angles of the said wedges are so selected that any desired degree, minute and second group may be correctly built from a respective stack not exceeding five pieces.

4. A set of blocks for measuring angles comprising a series of wedge shaped pieces each including a predetermined angle and capable of being stacked up additively or subtractively in any desired combination, in which the said angles form a series of ever increasing integers having progressively increasing differences so calculated that by adding and subtracting the available blocks any difference or gap existing between two consecutive blocks may be interpolated to obtain all integers of angular scale measurement.

5. A set of blocks for measuring angles in units from one to sixty comprising a series of wedge shaped pieces each including a predetermined angle and capable of being stacked up additively or subtractively in any desired combination, in which the angles and their differences are progressively increasing in a manner calculated to obtain all integers from one to sixty.

NIKOLA TRBOJEVICH.